United States Patent
Alpay et al.

(10) Patent No.: US 8,648,277 B2
(45) Date of Patent: Feb. 11, 2014

(54) LASER DIRECT ABLATION WITH PICOSECOND LASER PULSES AT HIGH PULSE REPETITION FREQUENCIES

(75) Inventors: Mehmet E. Alpay, Portland, OR (US); Hisashi Matsumoto, Hillsboro, OR (US); Mark A. Unrath, Portland, OR (US); Guangyu Li, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 278 days.

(21) Appl. No.: 13/076,754

(22) Filed: Mar. 31, 2011

(65) Prior Publication Data

US 2012/0248075 A1    Oct. 4, 2012

(51) Int. Cl.
*B23K 26/00* (2006.01)
*B23K 26/36* (2006.01)

(52) U.S. Cl.
USPC .............. 219/121.68; 219/121.69; 250/492.1

(58) Field of Classification Search
USPC ............. 219/121.68, 121.69, 121.63–121.72, 219/121.83; 438/463; 250/492.1–492.3
See application file for complete search history.

(56) References Cited

U.S. PATENT DOCUMENTS

| 6,602,790 | B2 * | 8/2003 | Kian et al. | 438/690 |
| 7,547,866 | B2 * | 6/2009 | Tanaka et al. | 250/201.2 |
| 7,605,343 | B2 | 10/2009 | Lei et al. | |
| 2001/0045419 | A1 | 11/2001 | Dunsky | |
| 2006/0169677 | A1 | 8/2006 | Deshi | |
| 2007/0012665 | A1 | 1/2007 | Nelson | |
| 2007/0272668 | A1 | 11/2007 | Albelo et al. | |
| 2010/0301023 | A1 | 12/2010 | Unrath | |

OTHER PUBLICATIONS

Huemoeller, Ron et al., "Unveiling the Next Generation in Substrate Technology," Pan Pacific Symposium Conference Proceedings, Jan. 31, 2007 (10 pgs.).
Huemoeller, Ron et al.; "Unveiling the Next Generation Integrated Circuit Substrate Circuit Formation," circuitree.com; Jun. 2007 (4 pgs.).
Notification of Transmittal of the International Search Report and the Written Opinion of the International Searching Authority, or the Declaration, for PCT/US2012/030375, filed Mar. 23, 2012.

\* cited by examiner

*Primary Examiner* — Samuel M Heinrich
(74) *Attorney, Agent, or Firm* — Stoel Rives LLP (57) ABSTRACT

Laser direct ablation (LDA) produces patterns cut into a dielectric layer for the formation of electrically conductive traces with controlled signal propagation characteristics. LDA processing includes selecting a dose fluence for removing a desired depth of material along a scribe line on a surface of a workpiece, selecting a temporal pulsewidth for each laser pulse in a series of laser pulses, and selecting a pulse repetition frequency for the series of laser pulse. The pulse repetition frequency is based at least in part on the selected temporal pulsewidth to maintain the selected dose fluence along the scribe line. The selected pulse repetition frequency provides a predetermined minimum overlap of laser spots along the scribe line. The LDA process further includes generating a laser beam including the series of laser pulses according to the selected dose fluence, temporal pulsewidth, and pulse repetition frequency.

24 Claims, 7 Drawing Sheets

LASER DIRECT ABLATION WITH PICOSECOND LASER PULSES AT HIGH PULSE REPETITION FREQUENCIES

TECHNICAL FIELD

This disclosure relates to laser micromachining. In particular, this disclosure relates to systems and methods for scribing patterns in a workpiece for the formation of electrically conductive traces with controlled signal propagation characteristics.

BACKGROUND INFORMATION

Integrated circuit (IC) substrate manufacturing technology aims to reduce substrate size and cost and to increase functionality. A recent advance uses laser direct ablation (LDA) and special plating processes to form electrical signal traces or paths inside a dielectric layer, as opposed to forming signal traces on the surface of the dielectric layer using conventional lithography technology. The embedded trace approach reduces overall layer counts, improves cost and yield, and improves electrical performance by reducing signal length and optimizing trace routing. The embedded trace approach may be achieved by forming signal traces having widths that are 10 µm or less in conjunction with padless microvia design. Known methods for dielectric removal, however, lack productive and cost effective manufacturing techniques suitable for high-volume production.

Ultraviolet (UV) excimer and yttrium aluminum garnet (YAG) laser sources have been discussed for LDA. UV YAG systems can be operated in both vector and raster scanning methods. UV YAG architectures generally do not require an imaging mask. Thus, UV YAG systems offer flexibility and rapid adaption of design change. Excimer laser ablation, on the other hand, uses a mask projection technique to remove materials in a large area. Thus, excimer laser ablation can provide high throughput when a pattern includes many lands, ground planes, or other larger features. The throughput when using an excimer laser is independent from pattern density inside the mask area. However, increasing pattern density may significantly impact throughput in the case of direct writing methods using a UV YAG laser. Excimer ablation exhibits better resolution and depth control, as compared to those when using a UV YAG laser, because of uniform and incremental dielectric removal over the mask area. The power rating of a UV YAG laser may be from about 3 Watts to about 40 Watts, and the power rating of an excimer laser may be up to about 300 Watts. UV YAG lasers generally operate at a pulse repetition rate from about 50 kHz to about 250 kHz, while the pulse repetition rate of an excimer laser is generally a few hundreds of Hertz. UV YAG and Excimer laser systems both provide processing for a broad choice of dielectric materials due to the higher ablation in UV wavelengths (e.g., about 355 nm is typical for UV YAG lasers, and about 248 nm and about 308 nm are typical for excimer lasers).

SUMMARY OF THE DISCLOSURE

Systems and methods use a short temporal pulsewidth laser with a high pulse repetition frequency for effective LDA processing. The high pulse repetition frequency allows the laser beam to move rapidly across the workpiece (for high throughput) while maintaining sufficient pulse overlap. The short temporal pulsewidth makes for more efficient and cleaner material removal. In certain embodiment, a UV laser is used. In other embodiments, a green laser is used.

In one embodiment, a method for laser direct ablation produces patterns cut into a dielectric layer for the formation of electrically conductive traces with controlled signal propagation characteristics. The method includes selecting a dose fluence for removing a desired depth of material along a scribe line on a surface of a workpiece, selecting a temporal pulsewidth for each laser pulse in a series of laser pulses, and selecting a pulse repetition frequency for the series of laser pulse. The selection of the pulse repetition frequency is based at least in part on the selected temporal pulsewidth to maintain the selected dose fluence along the scribe line. The selected pulse repetition frequency provides a predetermined minimum overlap of laser spots along the scribe line. The method further includes generating, using a laser source, a laser beam including the series of laser pulses according to the selected dose fluence, temporal pulsewidth, and pulse repetition frequency. The method also includes providing relative motion between the workpiece and the laser beam such that a path of the laser beam follows the scribe line location along the surface of the workpiece at a selected velocity.

In certain embodiments, the selected temporal pulsewidth is less than or equal to 1 µs, the selected temporal pulsewidth is in a range between about 10 ps and about 29 ns, and the selected velocity is in a range between about 1 m/s and about 10 m/s. In other embodiments, the selected velocity is in a range between about 2 m/s and about 4 m/s. In addition, or in other embodiments, the predetermined minimum overlap of laser spots along the scribe line is about 60% of a spot size diameter, the spot size diameter is in a range between about 5 µm and about 30 µm, and the selected pulse repetition frequency is in a range between about 750 kHz and about 5 MHz.

In certain embodiments, the method further includes determining an operating fluence of the laser source as a function of the selected temporal pulsewidth. The operating fluence comprises the selected dose fluence divided by a square root of the selected temporal pulsewidth. Selecting the pulse repetition frequency may include scaling a maximum pulse repetition frequency of the laser source by the square root of the pulsewidth, calculating (for the selected minimum overlap of laser spots along the scribe line) a minimum pulse repetition frequency based on a spot size and the selected velocity, and selecting the pulse repetition frequency to be between the scaled maximum pulse repetition frequency and the calculated minimum pulse repetition frequency.

In certain embodiments, the method further includes dithering the laser beam back and forth in a dither direction while the path of the laser beam follows the scribe line location along the surface of the workpiece at the selected velocity.

Additional aspects and advantages will be apparent from the following detailed description of preferred embodiments, which proceeds with reference to the accompanying drawings.

DETAILED DESCRIPTION OF CERTAIN EMBODIMENTS

I. Overview

Systems and methods provide productive processing (e.g., using a vector scan approach) having a high throughput in a laser direct ablation (LDA) application. High-speed beam positioning and high pulse repetition frequencies (PRFs) provide sufficient overlap of successive laser pulses to control the uniformity and features of kerfs cut in a dielectric material. Known plating processes may then be used to form electrical paths in the kerfs with desired signal propagation characteristics (e.g., impedance, resistance, and capacitance).

In certain embodiments, a high-speed beam positioning scheme is used in combination with a mode locked laser. As beam positioning technology advances, the pulse repetition rate of the laser source becomes a limiting factor. For example, with a 10 μm spot size at a workpiece, a laser source running at 10 kHz pulse repetition frequency (PRF), and a velocity of the laser beam with respect to a surface of the workpiece higher than 100 mm/second, the bite size (distance between a laser spot and a next laser spot) is 10 μm or larger. Thus, in this example, there is no pulse overlap and the laser beam creates discrete dots or dashed lines in the workpiece that (when plated with an electrically conductive material) prevent signal propagation and/or degrade the signal propagation characteristics (as compared to continuous and uniform lines).

To utilize a high-speed beam positioning scheme, a high PRF is used according to certain embodiments to provide a desired pulse overlap percentage. Higher PRFs may be used as the spot diameter becomes smaller. The pulse overlap percentage is defined as (spot size−bite size)/spot size*100%. In one embodiment, the pulse overlap percentage is at least 60% to provide a stable cumulative fluence distribution using a Gaussian beam. The mode locked laser allows having a high pulse overlap percentage because of its high frequency operation. However, this disclosure is not limited to mode locked laser operation and artisans will recognize from the disclosure herein that other types of lasers may also be used. In other words, as long as the PRF is high enough to provide the desired pulse overlap percentage, the high-speed beam positioning scheme can still be utilized.

In certain embodiments, the laser produces laser pulses having short temporal pulsewidths. While continuous wave (CW) laser operation as the laser beam is moved over the material surface eliminates the concern about spot-to-spot distance, CW operation may cause undesirable thermal accumulation. Using short temporal pulsewidth mode locked lasers reduces or minimizes undesirable thermal accumulation. In addition, the short temporal pulsewidth may increase the material absorption of laser energy at certain wavelengths. The effective ablation threshold varies depending on the wavelength and the temporal pulsewidth. With a high intensity beam having a short temporal pulsewidth laser, the non-linear absorption can cause a rate of temperature increase to surpass a thermal decomposition temperature of the organic resin so as to ablate the material. Therefore, ablation threshold fluence shifts toward the lower side.

In certain embodiments, the laser pulses have UV wavelength. The LDA process forms trenches in a dielectric resin and the trenches are later metalized to make the trenches into electrically conductive traces. The UV wavelength may be useful because of better absorption in printed wiring board materials. The ablation efficiency may be higher, and the ablation threshold fluence may be lower with shorter wavelengths in the UV range. In other embodiments, visible wavelengths can be used. For example, a green laser that produces laser pulses with temporal pulsewidths in the nanosecond range may be used. However, such a green laser may require about five times higher average power and about an eighth slower, as compare to a UV laser that produces laser pulses with temporal pulsewidths in the picosecond range.

Reference is now made to the figures in which like reference numerals refer to like elements. In the following description, numerous specific details are provided for a thorough understanding of the embodiments disclosed herein. However, those skilled in the art will recognize that the embodiments can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

II. LDA Processing

Figure 1:
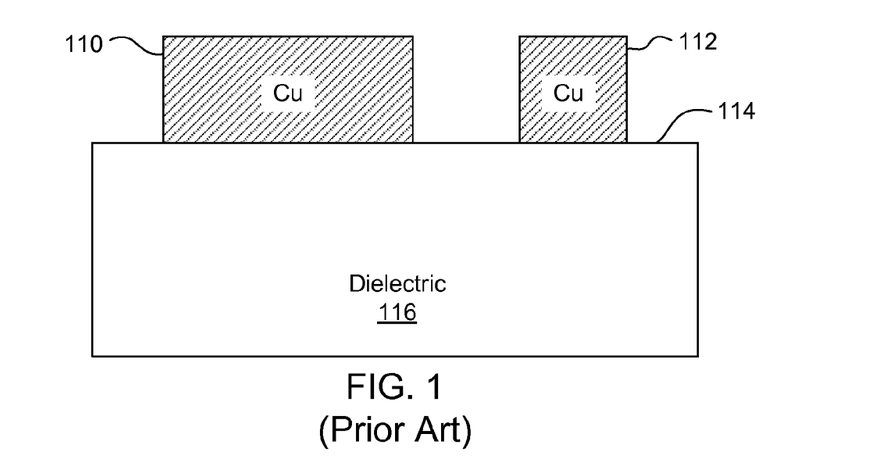
FIG. 1 schematically illustrates a side view of a first electrically conductive trace and a second electrically conductive trace on a top surface of a dielectric material.

FIG. 1 schematically illustrates a side view of a first electrically conductive trace 110 and a second electrically conductive trace 112 on a top surface 114 of a dielectric material 116. The electrically conductive traces 110, 112 may include, for example, copper (Cu).

Figure 2A:
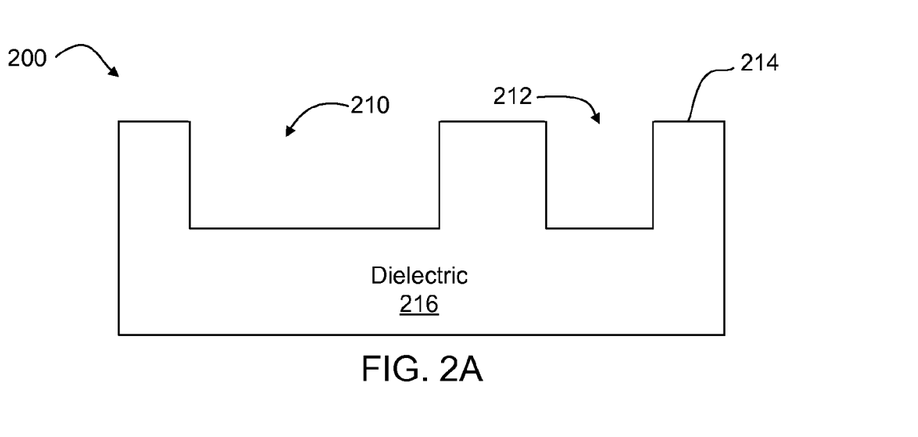
FIG. 2A schematically illustrates a side view of a workpiece comprising a first kerf and a second kerf cut into a top surface of a dielectric material using laser ablation according to one embodiment.

FIG. 2A schematically illustrates a side view of a workpiece 200 comprising a first kerf 210 and a second kerf 212 cut into a top surface 214 of a dielectric material 216 using laser ablation according to one embodiment. The dielectric material 216 may include an organic resin (which may also include inorganic reinforcing particles and/or metals). In certain embodiments, the dielectric material 216 comprises ABF GX-3 or ABF GX-13 dielectric film available from Ajinomoto Fine-Techno Co., Inc. of Kawasaki, Japan.

Figure 2B:
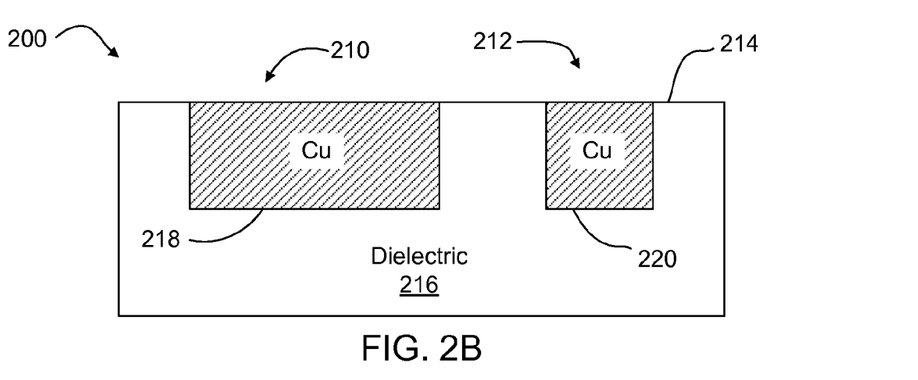
FIG. 2B schematically illustrates a side view of the workpiece shown in FIG. 2A with a first electrically conductive trace formed in the first kerf and a second electrically conductive trace formed in the second kerf according to one embodiment.

FIG. 2B schematically illustrates a side view of the workpiece 200 shown in FIG. 2A with a first electrically conductive trace 218 formed in the first kerf 210 and a second electrically conductive trace 220 formed in the second kerf 212 according to one embodiment. The electrically conductive traces 218, 220 may include copper (Cu) or another electrically conductive material. As shown in FIG. 2B, forming the electrically conductive traces 218, 220 within the respective kerfs 210, 212 reduces the overall height of the workpiece 200 (as compared to FIG. 1). Further, the electrically conductive traces 110, 112 shown in FIG. 1 are each bound on only one side to the top surface 114 of the dielectric material 116, whereas the electrically conductive traces 218, 220 shown in FIG. 2B are each bound on three sides to the dielectric material 216, which reduces trace cracking under stress and the separation of the electric circuit from the dielectric material 216. Forming the electrically conductive traces 218, 220 within the respective kerfs 210, 212 also reduces overall layer counts, improves cost and yield, and improves electrical performance by reducing signal length and optimizing trace routing.

Figure 3:
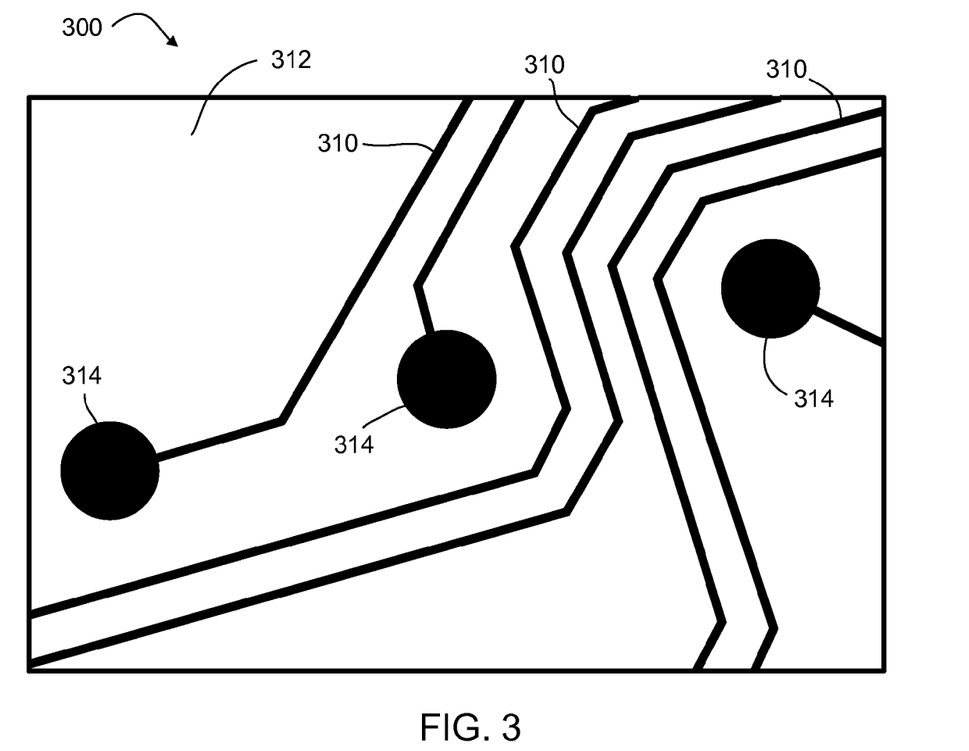
FIG. 3 schematically illustrates a top view of a workpiece including a plurality of kerfs cut into a top surface of a dielectric material using laser ablation according to one embodiment.

FIG. 3 schematically illustrates a top view of a workpiece 300 including a plurality of kerfs 310 (six shown) cut into a top surface of a dielectric material 312 using laser ablation according to one embodiment. In certain embodiments, the kerfs 310 each have a width in a range between about 5 μm and about 15 μm. An artisan will recognize from the disclosure herein that wider kerfs and/or larger features (e.g., pads) may also be scribed into the surface of the dielectric material 312. For example, FIG. 3 also shows a plurality of vias 314 (three shown) formed in the dielectric material 312 using laser ablation techniques described herein. Vias are electrically conductive structures extending through a die package substrate or a circuit board. An electrical path is typically provided by depositing a layer of conductive material onto the inner wall of a via hole. In a conventional padded via, the via pad may represent a large percentage, for example more than 50%, of the total lateral area consumed by a via. Laser processing embodiments disclosed herein reduce or eliminate the via pad to substantially decrease the surface footprint of the via 314, with corresponding enhancements in both available surface space and interconnect routing flexibility and efficiency.

With reference to FIGS. 2A and 2B, the laser ablation of the kerfs 210, 212 in the dielectric material 216 may be characterized using a dose fluence, which may be controlled by parameters such as power, velocity of the laser beam with respect to the workpiece 200, and spot size. See, for example, the following equation for dose fluence:

$$DoseFluence = \text{coefficient} \cdot \frac{Power}{\pi \cdot Velocity \cdot \omega_0},$$

where $\omega_0$ is the spot radius.

The higher the dose fluence, the higher the volume removal of target material. When the desired width and depth of the kerfs 210, 212 are given, the dose fluence may be determined. For faster material removal (e.g., higher throughput), the velocity of beam scanning may be a factor. The laser power may be maintained in order to provide a constant range of dose fluence.

A picosecond UV laser source (see FIG. 12) may be used for directly ablating the dielectric material 216. In one embodiment, the laser source comprises a mode locked laser that may operate at PRFs up to about 80 MHz. The per pulse energy of the laser source may be as low as a few nanojoules (nJ), providing an operating fluence of as little as a few mJ/cm$^2$ over less than a 10 μm spot diameter. Other embodiments use other wavelengths and/or temporal pulsewidths. For example, FIGS. 4, 5, 6, and 7 illustrate differences between processing a dielectric (ABF GX-13) using a picosecond green laser, a nanosecond green laser, a picosecond UV laser, and a nanosecond UV laser.

III. Example Laser Parameters for UV and Green Lasers

Figure 4:
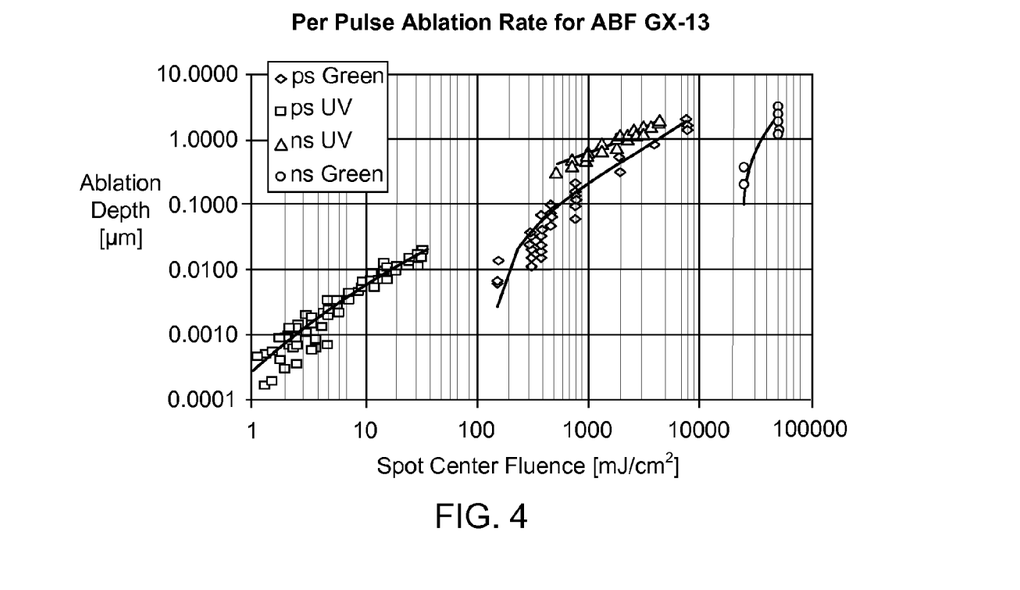
FIG. 4 graphically illustrates ablation rate per pulse for a dielectric material according to certain embodiments.

FIG. 4 graphically illustrates ablation rate per pulse for a dielectric material (ABF GX-13) according to certain embodiments. The fluence shown along the x-axis of the graph is at the center of Gaussian spot. The per pulse ablation depth values are shown along the y-axis of the graph. As shown in FIG. 4, the UV wavelength may have an advantage over the green wavelength for material removal efficiency in certain embodiments. The ablation rate of the nanosecond UV laser is almost twice as high as the ablation rate of the picosecond green laser. As also shown in FIG. 4, the picosecond temporal pulsewidth may have an advantage over the nanosecond temporal pulsewidth in certain embodiments. The threshold fluence to initiate effective ablation using the nanosecond lasers is substantially higher than the threshold fluence to initiate effective ablation using the picosecond lasers.

Figure 5:
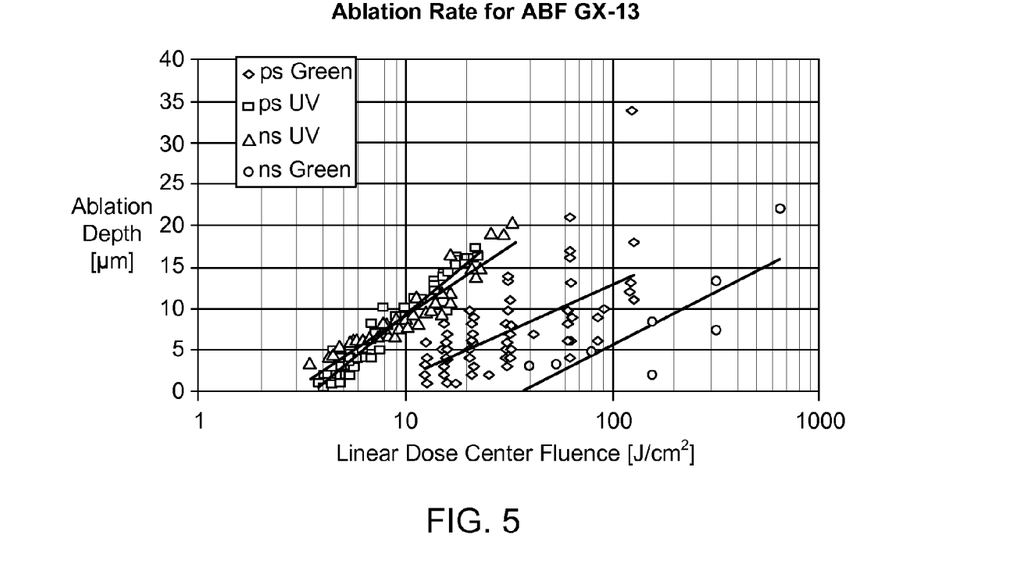
FIG. 5 graphically illustrates ablation rate as a function of linear dose fluence according to certain embodiments.

FIG. 5 graphically illustrates ablation rate as a function of linear dose fluence according to certain embodiments. While the "spot center fluence" shown in FIG. 4 refers to energy density associated with a single laser pulse impacting a single point on a workpiece, the "linear dose fluence" in FIG. 5 refers to the cumulative energy density associated with a series of pulses that are delivered across a line segment on the workpiece. The spot center fluence is 2*(pulse energy/pulse area). The factor of 2 is due to the energy distribution being Gaussian within each laser pulse (twice the average density is at the spot center). For the linear does fluence, moving the laser beam having a spot diameter D over a line segment of length L at a speed v, while firing the laser at a repetition rate R and power P, results in delivering R*L/v with each pulse having an energy of P/R. Thus, a total energy of P*L/v is delivered over a rectangular area of "L by D," and the linear dose is:

$$k*(P*L/v)/(L*D)=k*P/(v*D).$$

The factor k comes from the Gaussian nature of individual laser pulses.

The linear dose fluence shown along the x-axis of the graph is at a center of a Gaussian spot, which is defined by cumulative fluence over the spot area as the laser beam moves over the work area. The ablation depth values are shown along the y-axis of the graph. As shown in FIG. 5, the UV wavelength may have an advantage over the green wavelength in certain embodiments. Note that the ablation rate of the UV laser using picosecond and nanosecond temporal pulsewidths matches quite well (i.e., the UV picosecond and nanosecond data points are relatively close to one another), while the nanosecond green laser requires a substantially higher linear dose fluence to obtain similar ablation depths than those obtained with the picosecond green laser.

Figure 6:
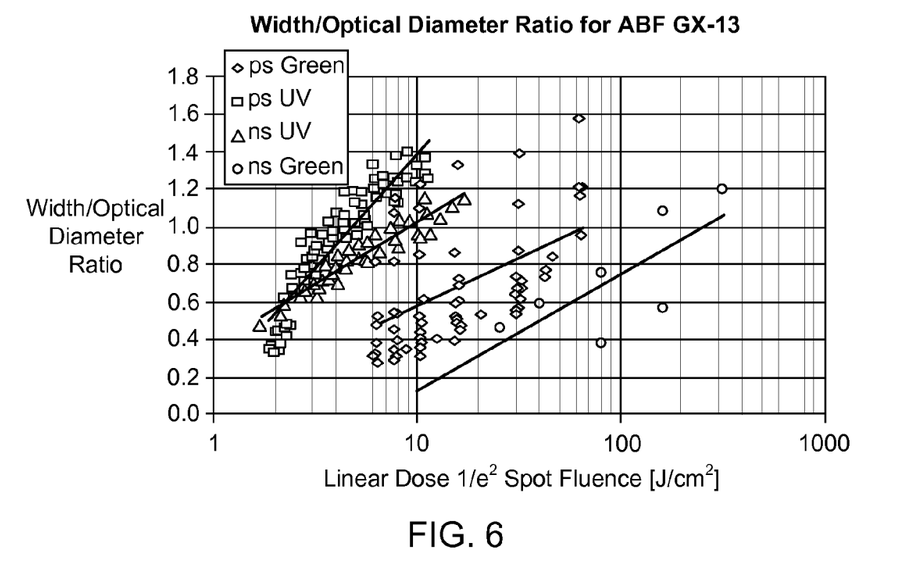
FIG. 6 graphically illustrates the ratio between the kerf width and optical spot diameter vs. dose fluence at $1/e^2$ Gaussian spot according to certain embodiments.

FIG. 6 graphically illustrates the ratio between the kerf width and optical spot diameter vs. dose fluence at 1/e$^2$ Gaussian spot according to certain embodiments. The ratio between the kerf width and optical spot diameter is shown along the y-axis of the graph, and the dose fluence at 1/e$^2$ Gaussian spot is shown along the x-axis of the graph. As shown in FIG. 6, the effective threshold of dose fluence is lowest with the picosecond UV laser and highest with the nanosecond green laser in certain embodiments. Note that the picosecond UV result shows a slightly wider kerf than that of the nanosecond UV result at about the same dose fluence.

Figure 7:
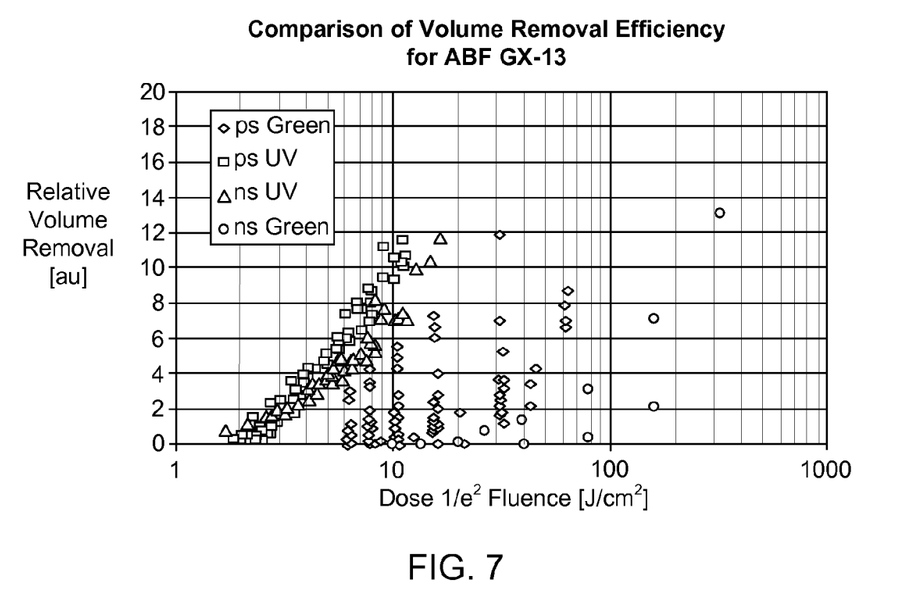
FIG. 7 graphically illustrates a comparison of volume removal efficiency according to certain embodiments.

FIG. 7 graphically illustrates a comparison of volume removal efficiency according to certain embodiments. The relative volume removal is shown as arbitrary unit (au) along the y-axis of the graph, and the dose fluence at $1/e^2$ Gaussian spot is shown along the x-axis of the graph. Because of the small difference shown in FIG. 7, the picosecond UV laser exhibits only slightly better volume removal efficiency than that of the nanosecond UV laser.

IV. An LDA Processing Method

Figure 8:
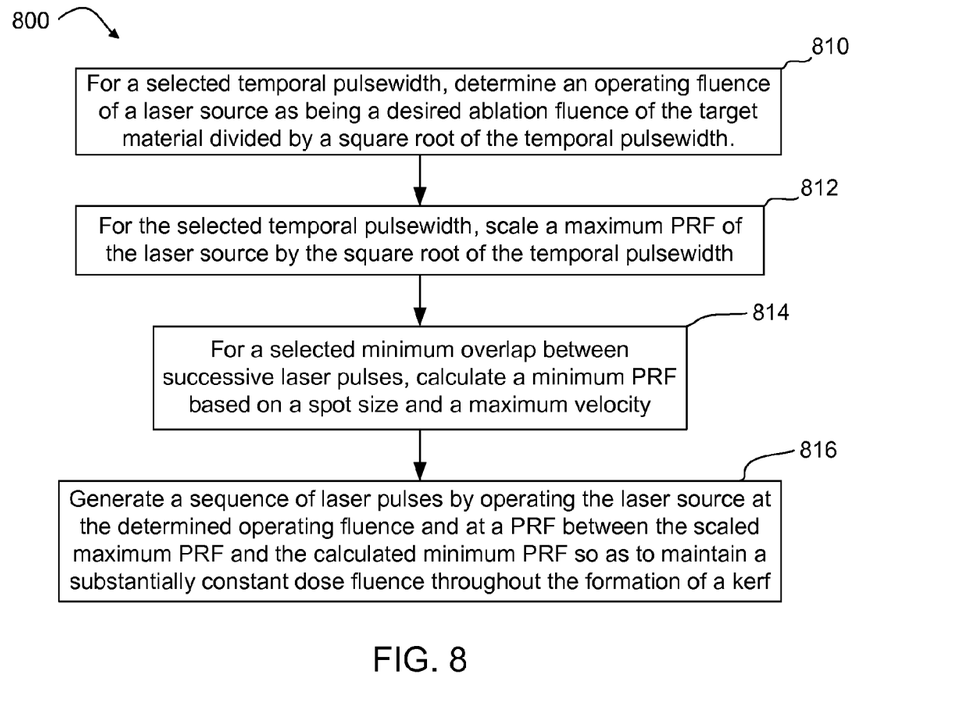
FIG. 8 is a flow diagram of a method for laser ablating kerfs into a dielectric material according to one embodiment.

FIG. 8 is a flow diagram of a method 800 for laser ablating kerfs into a dielectric material according to one embodiment. The method 800 may be used, for example, as part of an LDA process that produces patterns cut into the dielectric material for the formation of electrically conductive traces with controlled signal propagation characteristics. The method 800 includes, for a selected temporal pulsewidth, determining 810 an operating fluence of the laser as being a desired ablation fluence of the target material divided by a square root of the temporal pulsewidth. Then, for the selected temporal pulsewidth, scaling 812 a maximum PRF of the laser source by the square root of the temporal pulsewidth. The method 800 also includes, for a selected minimum overlap between successive laser pulses, calculating 814 a minimum PRF based on a spot size and a maximum velocity of the laser beam with respect to a surface of the workpiece. In one embodiment, the selected minimum overlap is 60% of the beam spot diameter, i.e., (spot size−bite size)/spot size*100%=60%. The method 800 further includes generating 816 a sequence of laser pulses by operating the laser source at the determined operating fluence and at a PRF between the scaled maximum PRF and the calculated minimum PRF so as to maintain a substantially constant dose fluence throughout the formation of a kerf.

V. Example LDA Processing Parameters

The following example illustrates how the method of FIG. 8 may be used for LDA processing ABF GX-13 using specific values for temporal pulse widths, fluences, PRFs, and other processing parameters. An artisan will recognize that the example materials and parameter values are provided by way of example only, and not by way of limitation. The example uses a UV laser source. As discussed above, however, other wavelengths may also be used (e.g., green).

Figure 9:
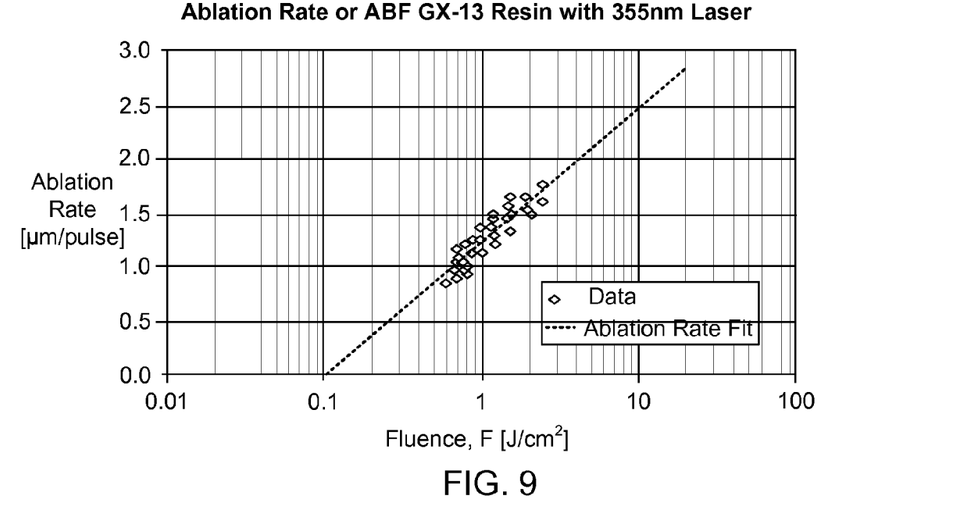
FIG. 9, which graphically illustrates an ablation rate of ABF GX-13 resin with a 355 nm laser according to one embodiment.

The bulk ablation rate, $\chi$ (or etch rate), of an organic material using a UV laser source is generally modeled by:

$$\chi = \frac{1}{\alpha} \cdot \ln\!\left(\frac{\theta}{\theta_{th}}\right),$$

where $\alpha$ is an absorption coefficient [cm$^{-1}$] of a material at a laser wavelength, $\theta$ is an operating fluence [J/cm$^2$] of the laser source, and $\theta_{th}$ is a threshold fluence for initiating ablation in the material. For an ABF GX-13 resin drilling process using various nanosecond UV lasers with imaged optics, $\alpha$ was regressed to approximately 18513.57471 cm$^{-1}$, where $\theta_{th}$ was approximately 0.104887849 J/cm$^2$. See, e.g., FIG. 9, which graphically illustrates an ablation rate of ABF GX-13 resin with a 355 nm laser according to one embodiment. The ablation rate fit curve for the data points in FIG. 9 is given by y=(1/1.851357471E+04)^ln(F/0.104887849).

Generally, polymers tend to decompose before evaporation. Long chains of molecules are cut into fragments before they are able to leave the bulk of the material. Thermal activation of the ablation may appear as a typical "Arrhenius tail" instead of the definite ablation threshold. This is based on the laser ablation being a photo thermal bond-breaking reaction within the bulk of the material originated from laser heating. Different ablation models may be considered. In photochemical based models, electronic excitation results in direct bond breaking without thermalization. In thermal based models, the bonds are thermally broken, which thermal nature of the ablation process is supported by the observation of Arrhenius tails, as well as the dependence of the ablation rate and ablation threshold on the laser pulse repletion rate and pulse width. In photophysical models, both thermal and non-thermal features are used and are considered either as two independent channels of bond breaking, or as implying different bond breaking energies for ground state and electronically exited chromophores.

The threshold fluence decreases by increasing absorption coefficient, irrespective of whether the decreasing threshold fluence is related to a decrease in laser wavelength, to the addition of dopants, or to the generation of defects. Or, the threshold fluence may be decreased by decreasing the temporal pulsewidth. With shorter pulses, the spatial dissipation of the excitation energy is reduced and threshold fluence is reached at lower fluence. This observation can be related to a decrease in heat penetration depth and/or an increase in absorption coefficient due to multi-photon excitation.

Assuming that the ablation is initially made by heating the material, the material temperature can be approximated by using fluence and temporal pulsewidth. The following equations are based on a one-dimensional (1D) surface temperature model during a pulse and after the pulse. This analytical model uses a top hat beam profile for both temporal and spatial shape, for simplicity. Other temporal and spatial shapes may also be used. The model is fairly accurate if beam diameter is larger and if the resin thickness is thicker than a thermal diffusion distance of the resin.

For the surface temperature model, an equation for surface temperature during the pulse period is given by:

$$T(0, t)_{0 \le t \le \tau} = \frac{2\varepsilon \cdot I}{K} \sqrt{\frac{\kappa \cdot t}{\pi}} + T_0,$$

where $\tau$ is the pulse period, $\varepsilon$ is the absorption, I is the irradiance intensity, K is the thermal conductivity, $\kappa$ is the thermal diffusivity, and $T_0$ is an initial surface temperature before the pulse period.

An equation for the surface temperature after the pulse period is given by:

$$T(0, t)_{t \ge \tau} = \frac{2\varepsilon \cdot I}{K} \cdot \sqrt{\frac{\kappa}{\pi}} \cdot \left(\sqrt{t} - \sqrt{t - \tau}\right) + T_0.$$

At t=τ, when T=$T_d$ (decomposition temperature):

$$T(0, \tau) = T_d = \frac{2\varepsilon \cdot I}{K}\sqrt{\frac{\kappa \cdot \tau}{\pi}} + T_0.$$

Simplifying all material related constants into a single constant, C $$C = \frac{\sqrt{\pi}\, K(T_d - T_0)}{2\varepsilon\sqrt{\kappa}},$$

the equation becomes:

$$\frac{\theta}{\sqrt{\tau}} = C$$

or $$I\sqrt{\tau} = C.$$

When the constant C is the same, the surface temperature T of the material is the same even with different irradiance intensity and temporal pulsewidth values. There are some values of C for which decomposition temperature of polymer materials is exceeded. This method has been successfully adapted for characterizing the cosmetic look of a copper capture pad in blind via formation.

The following equations include temperature inside the material during the pulse and after the pulse.

An equation for temperature during the pulse period is given by:

$$T(z, t)_{0 \le t \le \tau} = \frac{2\varepsilon \cdot I}{K}\sqrt{\kappa \cdot t} \cdot \mathrm{ierfc}\left(\frac{z}{2\sqrt{\kappa \cdot t}}\right) + T_0,$$

where z is depth inside the material, and ierfc is the integral of complimentary error function (see the equations below).

An equation for temperature after the pulse period is given by:

$$T(z, t)_{t \ge \tau} =$$

$$\frac{2\varepsilon \cdot I \cdot \sqrt{\kappa}}{K} \cdot \left[\sqrt{t} \cdot \mathrm{ierfc}\left(\frac{z}{2\sqrt{\kappa \cdot t}}\right) - \sqrt{(t-\tau)} \cdot \mathrm{ierfc}\left(\frac{z}{2\sqrt{\kappa(t-\tau)}}\right)\right] + T_0$$

where $$\mathrm{ierfc}(x) = \frac{e^{-x^2}}{\sqrt{\pi}} - x \cdot \mathrm{erfc}(x)$$

$$\mathrm{erfc}(x) = \frac{2}{\sqrt{\pi}} \int_x^\infty e^{-\zeta^2}\, d\zeta.$$

In this example, an absorption coefficient $\alpha = 10563.0357$ cm$^{-1}$ (penetration depth, $1/\alpha = 0.95033$ μm), and a reflection R=0.063149, which leads to an absorption $\in = (1-R) = 0.936851$ from an ellipsometer measurement of the resin, a thermal conductivity K=0.003 W/cm$^2$, and a thermal diffusivity $\kappa = 0.0025$ cm$^2$/s. The thermal decomposition temperature is 583° K, and the glass transition temperature is 363° K.

In this example, an estimated effective ablation threshold of the UV laser is about 4.55 mJ/cm$^2$ when using a temporal pulsewidth of about 50 ps, and about 110 mJ/cm$^2$ with a temporal pulsewidth of about 29 ns. The calculated constant C or $\theta/\tau^{1/2}$ value for these conditions turns out to be about the same value for the 50 ps and 29 ns temporal pulsewidths, 20.34 mJ/cm$^2 \cdot$ns$^{1/2}$. See the graph for the "low-end fluence" shown in FIG. 11. With the picosecond laser, a sharp temperature transition is observed, and the temperature raise in the material is shallow, which explains the lower ablation rate per pulse. See FIGS. 4 and 5.

In this example, a useful operating fluence value for the laser source is about 72.45 mJ/cm$^2 \cdot$ns$^{1/2}$. For UV laser pulses with a temporal pulse width of 50 ps, the fluence is:

72.45 mJ/cm$^2 \cdot$ns$^{1/2}$*(5000 ns)$^{1/2}$=16.2 mJ/cm$^2$.

For UV laser pulses with a temporal pulsewidth of 29 ns, the fluence is:

72.45 mJ/cm$^2 \cdot$ns$^{1/2}$*(29 ns)$^{1/2}$=390 mJ/cm$^2$.

Figure 10:
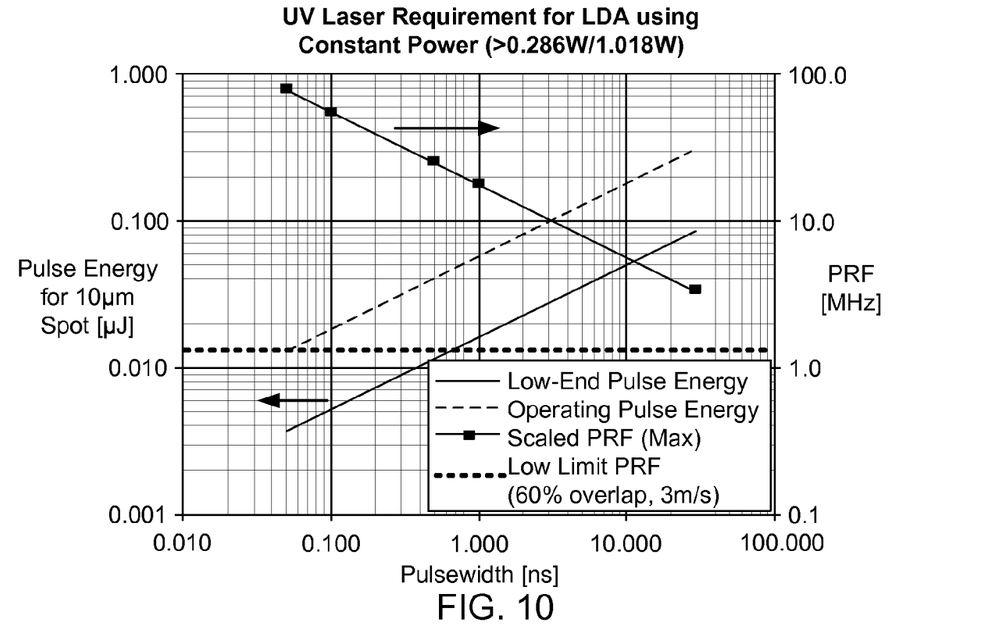
FIG. 10 graphically illustrates pulse energies and PRFs vs. pulsewidths for UV LDA processing of ABF GX-13 using constant power according to certain embodiments.
Figure 11:
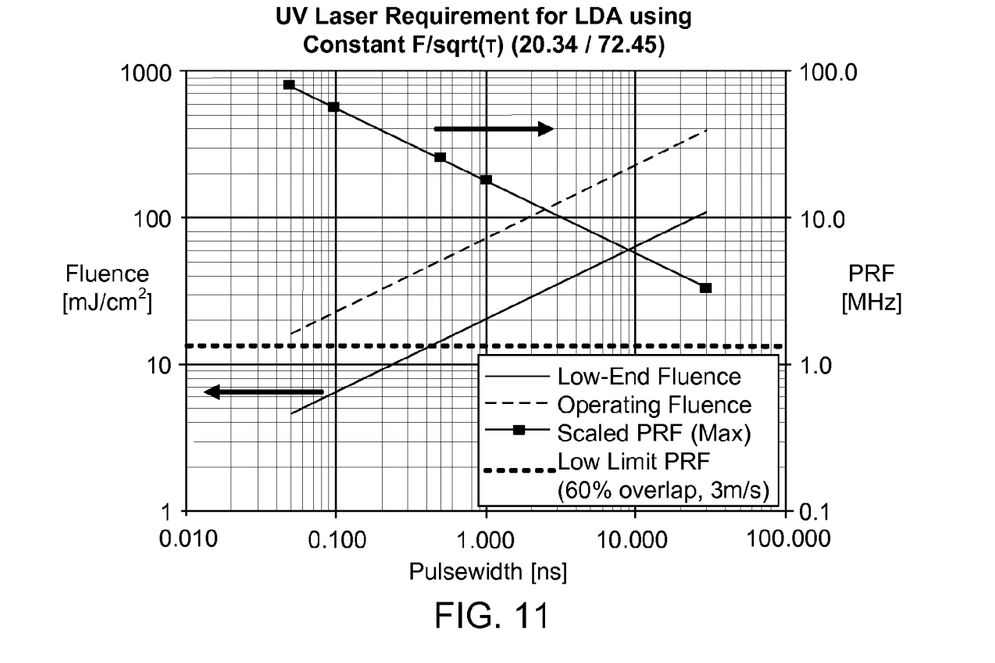
FIG. 11 graphically illustrates fluences and PRFs vs. pulsewidths for UV LDA processing of ABF GX-13 using constant fluence divided by the square root of the pulse period according to certain embodiments.

For this example, FIG. 10 graphically illustrates pulse energies and PRFs vs. pulsewidths for UV LDA processing of ABF GX-13 using constant power according to certain embodiments. FIG. 10 includes graphs for a low-end pulse energy, an operating pulse energy, a scaled maximum PRF (scaled from 80 MHz), and low limit PRF (using a 60% overlap of successive laser spots at a beam velocity of 3 m/s). Also for this example, FIG. 11 graphically illustrates fluences and PRFs vs. pulsewidths for UV LDA processing of ABF GX-13 using constant fluence divided by the square root of the pulse period according to certain embodiments. FIG. 11 includes graphs for a low-end fluence (at 20.34 mJ/cm$^2 \cdot$ns$^{1/2}$), an operating fluence (at 72.45 mJ/cm$^2 \cdot$ns$^{1/2}$), a scaled maximum PRF (scaled from 80 MHz), and low limit PRF (using a 60% overlap of successive laser spots at a beam velocity of 3 m/s). The estimated values shown in FIGS. 10 and 11 are based on the assumption that the ablation mechanism in this example follows more toward a thermal model (as opposed to the photochemical or photophysical models discussed above).

The operating fluence value of 72.45 mJ/cm$^2 \cdot$ns$^{1/2}$ translates into an average power requirement of at least 1.02 W at the work surface with a 10 μm spot. Power should be maintained constant for different temporal pulsewidth according to certain embodiments since the dose fluence plays a substantial role in determining throughput.

Based on the 80 MHz PRF with 50 ps laser, the maximum PRF is scaled by maintaining the same fluence over the square root of a particular temporal pulsewidth value. For example, 1 ns laser should be operated at no higher than:

Scaled PRF$_{MAX}$=80 MHz*(0.05)$^{1/2}$=17.9 MHz, to provide the operating fluence of 72.45 mJ/cm$^2$.

The minimum PRF is determined by spot size and beam velocity to use, which determines the pulse overlap percentage. As discussed above, higher than 60% pulse overlap reduces the gap between laser pulses and depth variation. If beam velocity is 3 m/sec with a 10 μm spot size diameter, the PRF is selected to be higher than about 750 kHz, which is given by:

10 μm*(1-60%)=4 μm,

PRF$_{MIN}$=(3 m/s)/(4 μm)=750 kHz.

Thus, in selection or development of laser parameters for LDA processing according to certain embodiments, pulsewidth cannot be neglected. For a given temporal pulsewidth, the operating fluence the laser source is a desired ablation fluence of the target material over the square root of pulse width. For example, (16.2 mJ/cm$^2$)/(5000 ns)$^{1/2}$=72.45 mJ/cm$^2$·ns$^{1/2}$. Then, the maximum PRF of the laser source (e.g., 80 MHz) is scaled based on the existing operating condition for given pulse width and required fluence. The minimum PRF is determined based on the spot size and maximum velocity for a minimum acceptable pulse overlap. The average power is maintained in order to maintain the dose fluence to achieve high throughput.

VI. Example LDA Processing System

Figure 12:
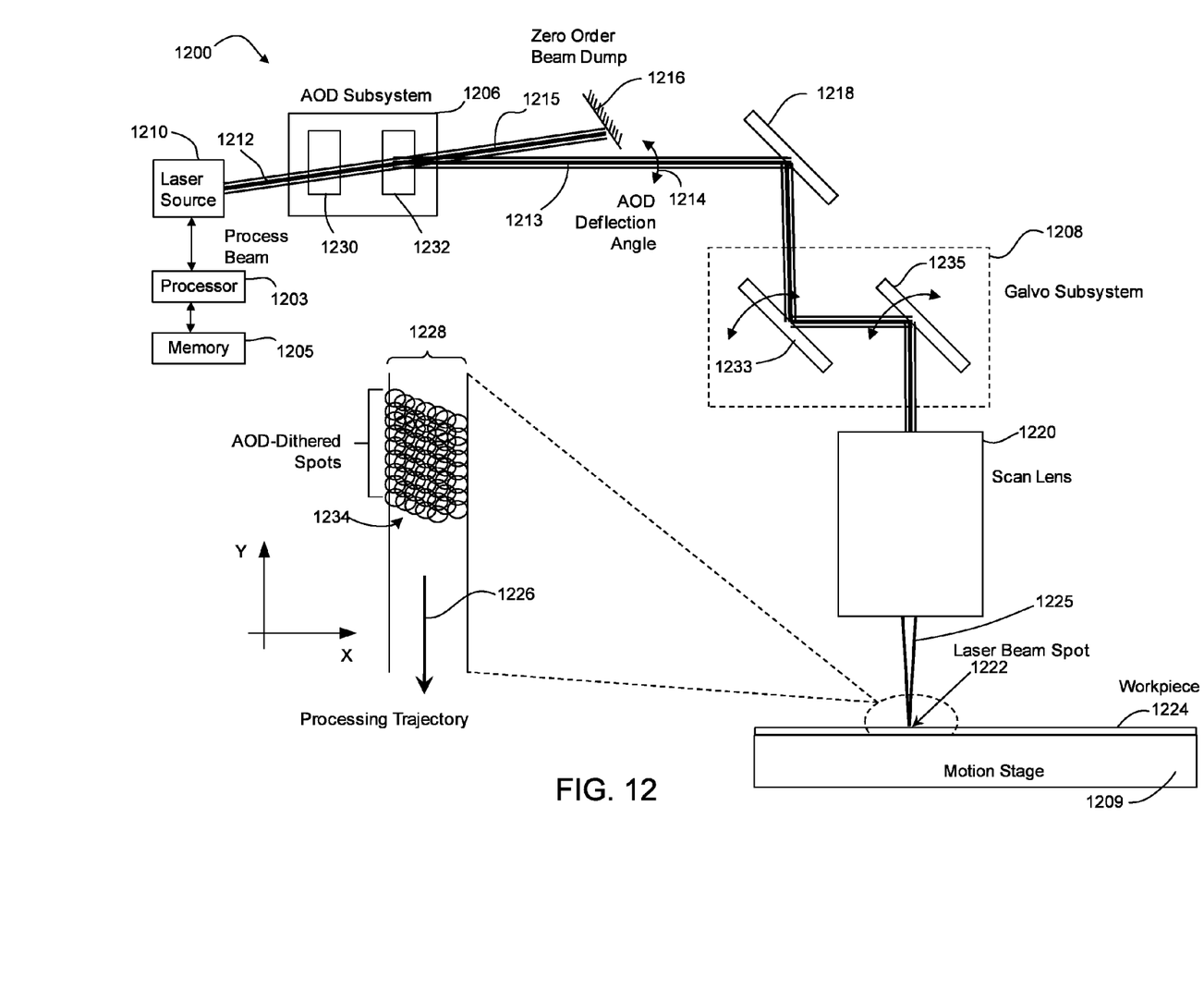
FIG. 12 is a block diagram of an example LDA processing system according to one embodiment.

FIG. 12 is a block diagram of an example LDA processing system 1200 according to one embodiment. The system 1200 includes an AOD subsystem 1206 and a galvanometer (galvo) subsystem 1208 for dithering a laser beam. The high PRFs discussed herein enable the use of the AOD subsystem 1206 for rapid dithering of the laser beam, as discussed below. The system 1200 includes a laser source 1210 for providing a process beam 1212 to the AOD subsystem 1206. In one embodiment, the laser source 1210 includes a pulsed laser source such that the process beam 1212 comprises a series of laser pulses. In another embodiment, the laser source 1210 includes continuous wave (CW) laser source such that the process beam 1212 comprises a CW laser beam. In certain such embodiments, the AOD subsystem 1206 generates laser pulses from the CW laser beam by deflecting the process beam 1212 at discrete ("pulse") intervals. The system 1200 further includes a processor 1203 configured to execute computer-executable instructions stored on a computer-readable medium (shown as memory device 1205) to perform the processes described herein. For example, the processor 1203 may execute instructions to perform the method described above with respect to FIG. 8.

The AOD subsystem 1206 deflects a first order beam 1213 of the process beam 1212 at an AOD deflection angle 1214 and a zero order beam 1215 of the process beam 1212 to a beam dump 1216. The system 1200 may further include a fixed mirror 1218 to deflect the first order beam 1213 to the galvo subsystem 1208, and a scan lens 1220 to focus a laser beam spot 1222 on or within a workpiece 1224. The output of the scan lens 1220 may be referred to herein as a focused laser beam 1225. The system also includes a motion stage 1209 for providing relative motion between the laser beam 1225 and the workpiece 1224. For example, the motion stage 1209 may include a linear X-Y stage and/or a Z stage.

In one embodiment, the AOD subsystem 1206 may include a single AOD used to provide deflection back and forth in a first direction (e.g., a dither direction) while the galvo subsystem 1208 provides deflection in a second direction along a processing trajectory 1226. For increased speed and versatility, however, the AOD subsystem 1206 in the embodiment illustrated in FIG. 12 provides 2-D deflection along an X-axis and a Y-axis with respect to a surface of the workpiece 1224. In this example, the Y-axis may be referred to as being parallel to the processing trajectory 1226 and the X-axis may be referred to as being perpendicular to the processing trajectory 1226. Thus, the X-axis may be referred to as the dithering direction. The processing trajectory 1226 may correspond to a direction along which, for example, the system 1200 scribes or cuts a trench 1228 (e.g., under control of the galvo subsystem 1208) into a surface of the workpiece 1224.

To provide the illustrated 2-D deflection, the AOD subsystem 1206 includes a first AOD 1230 to deflect the first order beam 1213 in a first direction and a second AOD 1232 to deflect the first order beam 1213 in a second direction, as the galvo subsystem 1208 moves the beam axis along a processing trajectory 1226. In other words, the movement of beam spot positions provided by the AOD subsystem 1206 is superimposed on the movement of the beam spot positions provided by the galvo subsystem 1208. As shown in FIG. 12, the galvo subsystem 1208 may also include a first galvo mirror 1233 and a second galvo mirror 1235 to deflect the first order beam 1213 in both the X-axis and Y-axis directions with respect to the surface of the workpiece 1224.

The orientation of the AOD deflections may not align to the deflection axes of the galvo subsystem 1208. In general, a coordinate transformation may be applied to the AOD deflection commands to align the resulting AOD deflections to a desired coordinate frame. This coordinate transformation may also be a function of velocity, rotating the AOD deflection coordinate frame in order to keep the AOD beam deflection perpendicular to the processing trajectory defined by the galvo subsystem 1208.

With the AOD subsystem 1206 included in the system 1200, several operational modes are enabled. In one embodiment, an operational mode includes an ability to dither the process beam 1212 to effectively widen the laser beam spot 1222 at the workpiece 1224. In other words, dithering the process beam 1212 includes spatially locating a series of focused laser beam spots 1234 to create geometric features having dimensions greater than those of an individual laser beam spot 1222 focused by the scan lens 1220. For illustrative purposes, FIG. 12 shows the dithered laser beam spots 1234 as viewed from above the surface of the workpiece 1224 as the trench 1228 is processed in the direction of the processing trajectory 1226. Thus, for example, the series of dithered laser beam spots 1234 at a given (high) repetition rate has the effect of a series of larger diameter laser beam spots successively applied in the direction of the processing trajectory 1226 at a lower pulse repetition rate.

In certain embodiments, the AODs 1230, 1232 can update their respective acoustic fields (filling the optical aperture with a new acoustic waveform) on the order of about 0.1 μs to about 10 μs. Assuming a nominal update rate of about 1 μs, the process beam's position can be rapidly updated such that several of the dithered laser beam spots 1234 overlap during processing. The dithered laser beam spots 1234 may overlap in the dimension (e.g., along the X-axis or dither direction) perpendicular to the processing trajectory 1226 to widen the feature (e.g., the trench 1228) being processed. As shown in FIG. 12, the dithered laser beam spots 1234 may also overlap in the direction of the processing trajectory 1226. To keep the dithered beam oriented normal to the processing trajectory 1226, according to certain embodiments, a dither axis may be constantly adjusted as the angle of the processing trajectory 1226 changes. In addition, the dither axis may be adjusted to compensate for the angle imparted on the line of dither points as a function of the process trajectory velocity. Given a trajectory velocity V, a dither update period Td, a number of dither points Npts, and a dither excursion Dd, this angle equals a tan [Td*(Npts−1)*V/Dd].

In addition to dithering the beam position with respect to the surface of the workpiece 1224, or in other embodiments, the AOD subsystem 1206 may be used to vary the intensity profile in the dither axis. The manipulation of the intensity profile of the process beam 1212 along the dither axis enables shaping of the cross-section of the processed trench 1228. For example, the trench 1228 may be processed with rectangular, U, or V shaped cross sections. Shaping features such as sidewall slope may be useful in situations such as intersection formation. The shaping resolution may be based on the fundamental spot size, and the shaped intensity profile may be a convolution of the dither pattern (location and intensity) and the spot intensity profile (e.g., Gaussian or another profile shape). A feature may be shaped, for example, by overlapping pulses at certain locations (e.g., two or more pulses may be applied at the same location) along the dither axis to remove selected amounts of target material, and/or by modulating the power amplitudes of laser pulses as a function of deflection position along the dither axis.

In addition to the shaping of the feature along the dither axis, or in other embodiments, the AOD subsystem 1206 may be used to control the power as a function of the position along the processing trajectory 1226 to allow similar shaping of the "endpoint" of a processed linear feature. Controlling the power as a function of the position along the processing trajectory 1226 may also be useful in applications such as intersection formation. The use of the AOD subsystem 1206 enables power modulation to occur at very high speeds (e.g., on the order of microseconds) such that fine control of intensity profiles (e.g., with feature dimensions in a range between about 5 μm and about 50 μm) may be possible at high processing velocities (e.g., in a range between about 1 m/s and about 5 m/s).

The AOD subsystem 1206 may also be used in certain embodiments to raster scan an area of the workpiece 1224 to form pads, or star scan to form vias.

As discussed above for LDA processing, the workpiece 1224 may include a layer of organic resin (which may include inorganic reinforcing particles and/or metals). The processing fluence of the laser source 1210 may be selected as described above, as long as it is higher than the effective ablation threshold of the target material in the workpiece 1224. The pulse energy used for LDA can be as low as a few nanojoules (e.g., for a 10 ps pulsewidth). As discussed above, short pulsewidths may help to lower the effective ablation threshold, and the material removal can still be observed even with such low pulse energy (or fluence). Heating affect from the duration of a short pulse may be small for LDA processing because of low thermal diffusivity of the resin (e.g., insulating material) in the target material of the workpiece 1224. Heating affect may become an issue in certain embodiments if the pulsewidth is longer than about 1 μs.

As discussed above, the laser source 1210 may be operated at a high PRF to maintain a desired pulse overlap for uniform geometrical pulse distribution along the cut. Pulse overlap may be higher than 60%, according to certain embodiments. A minimum desired PRF may be calculated by multiplying the bite size by the velocity of the laser beam 1225 with respect to the surface of the workpiece 1224. For example, maximum bite size to maintain 60% pulse overlap for a 7 μm spot size may be given by 7 μm*(1-60%)=2.86 μm. If velocity can go up to 10 m/s, for example, the minimum PRF is (10 m/s)/(2.86 μm)=3.5 MHz. As PRF becomes higher and higher, the pulse duration may be shortened so that ablation still occurs with the lower pulse energy (or fluence).

The average power may be determined by a desired depth and the available velocity. In one embodiment, the average power can be as low as 0.7 W when the target depth is about 13 μm using a 7 μm spot size and the scanning velocity is 1 m/s. In another embodiment, the average power can be as high as 25 W when the target depth is about 18 μm using a 14 μm spot size and a scanning velocity of 10 m/s. Extra power can be utilized by generating multiple beams to process more than one part at the same time for higher throughput.

In certain embodiments, the system 1200 provides a scanning velocity of up to 10 m/s. In other embodiments, scanning velocities higher than 10 m/s may be used.

In one embodiment, the laser source 1210 may be a mode-locked UV laser capable of a power greater than 2.5 W, a 50 ps temporal pulsewidth, a wavelength of 355 nm and a pulse repetition frequency of 80 MHz. The workpiece 1224 may be a high density interconnect (HDI), and feature size may be much larger than that for IC packaging (ICP). Therefore, the scan lens 1220 may include a 250.8 mm focal length lens to focus the laser beam 1225 down to approximately 21 μm. The scanning field size may be about 100 mm by about 100 mm, and a whole circuit pattern may be scribed using only the galvo field (e.g., relative motion between the laser beam 1225 and the workpiece 1224 provided by the galvo subsystem 1208). For processing the entire workpiece 1224, the motion stage 1209 may be used in a move step and repeat manner.

In one embodiment, the laser source 1210 comprises a 355 nm, 50 ps, 12 W, 80 MHz Pantera® laser available from Spectra-Physics of Santa Clara, Calif. In another embodiment, the laser source 1210 comprises a 355 nm, 12 ps, 2.5 W, 80 MHz Vanguard® laser available from Spectra-Physics. In another embodiment, the laser source 1210 comprises a 355 nm, 10 ps, 10 W, 80 MHz Paradin® laser from Coherent Inc. of Santa Clara, Calif. In another embodiment, the laser source 1210 comprises a 355 nm, 20-30 ns, 7 W, 30-70 kHz Avia® 7000 laser available from Coherent Inc. In another embodiment, the laser source 1210 comprises a 532 nm, 10-15 ns, 15-50 kHz, 11 W Hippo® laser available from Spectra-Physics. In another embodiment, the laser source 1210 comprises a 532 nm, 10 ps, 200 kHz-4 MHz, 1 W (e.g., converted using a Duetto® laser at 1064 nm available from Time-BandWidth Products AG of Zurich, Switzerland). An artisan will recognize from the disclosure herein that the laser source 1210 may also comprise other types of lasers or laser models.

It will be understood by those having skill in the art that many changes may be made to the details of the above-described embodiments without departing from the underlying principles of the invention. The scope of the present invention should, therefore, be determined only by the following claims.

The invention claimed is:

1. A method for laser direct ablation that produces patterns cut into a dielectric layer for the formation of electrically conductive traces with controlled signal propagation characteristics, the method comprising:
   selecting a dose fluence for removing a desired depth of material along a scribe line on a surface of a workpiece;
   selecting a temporal pulsewidth for each laser pulse in a series of laser pulses;
   selecting a pulse repetition frequency for the series of laser pulse, wherein the selection of the pulse repetition frequency is based at least in part on the selected temporal pulsewidth to maintain the selected dose fluence along the scribe line, and wherein the selected pulse repetition frequency provides a predetermined minimum overlap of laser spots along the scribe line;
   generating, using a laser source, a laser beam comprising the series of laser pulses according to the selected dose fluence, temporal pulsewidth, and pulse repetition frequency; and
   providing relative motion between the workpiece and the laser beam such that a path of the laser beam follows the scribe line location along the surface of the workpiece at a selected velocity.

2. The method of claim 1, wherein the selected temporal pulsewidth is less than or equal to 1 μs.

3. The method of claim 1, wherein the selected temporal pulsewidth is in a range between about 10 ps and about 29 ns.

4. The method of claim 1, wherein the selected velocity is in a range between about 1 m/s and about 10 m/s.

5. The method of claim 1, wherein the selected velocity is in a range between about 2 m/s and about 4 m/s.

6. The method of claim 1, wherein the predetermined minimum overlap of laser spots along the scribe line is about 60% of a spot size diameter.

7. The method of claim 1, wherein the spot size diameter is in a range between about 5 μm and about 30 μm.

8. The method of claim 1, wherein the selected pulse repetition frequency is in a range between about 750 kHz and about 5 MHz.

9. The method of claim 1, further comprising:
determining an operating fluence of the laser source as a function of the selected temporal pulsewidth, the operating fluence comprising the selected dose fluence divided by a square root of the selected temporal pulsewidth.

10. The method of claim 9, wherein selecting the pulse repetition frequency comprises:
scaling a maximum pulse repetition frequency of the laser source by the square root of the pulsewidth;
calculating, for the selected minimum overlap of laser spots along the scribe line, a minimum pulse repetition frequency based on a spot size and the selected velocity; and
selecting the pulse repetition frequency to be between the scaled maximum pulse repetition frequency and the calculated minimum pulse repetition frequency.

11. The method of claim 1, further comprising:
dithering the laser beam back and forth in a dither direction while the path of the laser beam follows the scribe line location along the surface of the workpiece at the selected velocity.

12. A system for laser direct ablation that produces patterns cut into a dielectric layer for the formation of electrically conductive traces with controlled signal propagation characteristics, the system comprising:
a processor;
a computer-readable medium storing computer-executable instructions for causing the processor to:
select a dose fluence for removing a desired depth of material along a scribe line on a surface of a workpiece;
select a temporal pulsewidth for each laser pulse in a series of laser pulses; and
select a pulse repetition frequency for the series of laser pulse, wherein the selection of the pulse repetition frequency is based at least in part on the selected temporal pulsewidth to maintain the selected dose fluence along the scribe line, and wherein the selected pulse repetition frequency provides a predetermined minimum overlap of laser spots along the scribe line;
a laser source to generate a laser beam comprising the series of laser pulses according to the selected dose fluence, temporal pulsewidth, and pulse repetition frequency; and
motion elements to provide relative motion between the workpiece and the laser beam such that a path of the laser beam follows the scribe line location along the surface of the workpiece at a selected velocity.

13. The system of claim 12, wherein the selected temporal pulsewidth is less than or equal to 1 μs.

14. The system of claim 12, wherein the selected temporal pulsewidth is in a range between about 10 ps and about 29 ns.

15. The system of claim 12, wherein the selected velocity is in a range between about 1 m/s and about 10 m/s.

16. The system of claim 12, wherein the selected velocity is in a range between about 2 m/s and about 4 m/s.

17. The system of claim 12, wherein the predetermined minimum overlap of laser spots along the scribe line is about 60% of a spot size diameter.

18. The system of claim 12, wherein the spot size diameter is in a range between about 5 μm and about 30 μm.

19. The system of claim 12, wherein the selected pulse repetition frequency is in a range between about 750 kHz and about 5 MHz.

20. The system of claim 12, wherein the computer-executable instructions further cause the processor to:
determine an operating fluence of the laser source as a function of the selected temporal pulsewidth, the operating fluence comprising the selected dose fluence divided by a square root of the selected temporal pulsewidth.

21. The system of claim 20, wherein the computer-executable instructions further cause the processor to select the pulse repetition frequency by:
scaling a maximum pulse repetition frequency of the laser source by the square root of the pulsewidth;
calculating, for the selected minimum overlap of laser spots along the scribe line, a minimum pulse repetition frequency based on a spot size and the selected velocity; and
selecting the pulse repetition frequency to be between the scaled maximum pulse repetition frequency and the calculated minimum pulse repetition frequency.

22. The system of claim 12, wherein the motion elements comprise one or more galvanometers.

23. The system of claim 12, wherein the motion elements further comprise an X-Y motion stage.

24. The system of claim 12, further comprising:
one or more acousto-optic deflectors to dither the laser beam back and forth in a dither direction while the path of the laser beam follows the scribe line location along the surface of the workpiece at the selected velocity.

* * * * *